US 8,486,608 B2

(12) United States Patent
Yoo et al.

(10) Patent No.: US 8,486,608 B2
(45) Date of Patent: Jul. 16, 2013

(54) PRINTING SUBSTRATE FOR LIQUID CRYSTAL DISPLAY, AND MANUFACTURING METHOD THEREOF

(75) Inventors: Soon Sung Yoo, Gunpo-si (KR); Oh Nam Kwon, Yongin-si (KR); Heung Lyul Cho, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 1088 days.

(21) Appl. No.: 11/476,806

(22) Filed: Jun. 29, 2006

(65) Prior Publication Data
US 2007/0000865 A1 Jan. 4, 2007

(30) Foreign Application Priority Data
Jun. 30, 2005 (KR) .................. 10-2005-0058871

(51) Int. Cl.
*G03F 7/00* (2006.01)
(52) U.S. Cl.
USPC ............................ 430/307; 430/323; 216/41
(58) Field of Classification Search
None
See application file for complete search history.

(56) References Cited

U.S. PATENT DOCUMENTS

| | | | | |
|---|---|---|---|---|
| 4,241,165 A | * | 12/1980 | Hughes et al. | 430/269 |
| 5,037,504 A | * | 8/1991 | Takeuchi | 216/40 |
| 7,105,280 B1 | * | 9/2006 | Deeman et al. | 430/320 |
| 2001/0014492 A1 | * | 8/2001 | Noguchi et al. | 438/118 |
| 2002/0119665 A1 | * | 8/2002 | Chapman | 438/700 |
| 2005/0031861 A1 | * | 2/2005 | Matsumura et al. | 428/354 |
| 2006/0134406 A1 | * | 6/2006 | Horigome et al. | 428/343 |

FOREIGN PATENT DOCUMENTS

| | | | |
|---|---|---|---|
| JP | 59033849 | * | 2/1984 |
| JP | 02086443 | * | 3/1990 |
| WO | WO-2004-065510 | * | 8/2004 |

OTHER PUBLICATIONS

Wikipedia PECVD deposition(2012).*
Wikepedia Glas (2012).*

* cited by examiner

*Primary Examiner* — John A. McPherson
(74) *Attorney, Agent, or Firm* — McKenna, Long & Aldridge, LLP.

(57) ABSTRACT

The present invention relates to the implementation of minute patterns and thus improving pattern resolution and transcription property. Provided is a printing substrate for a liquid crystal display comprising a transparent insulating substrate, and a material layer for dry etching formed on an upper surface of the transparent insulating substrate, the material layer for dry etching constituting a printing pattern, and a manufacturing method of a printing substrate for a liquid crystal display comprising forming a material layer on a transparent insulating substrate, applying a photo resist along a printing pattern on the upper side of the material layer, dry-etching the material layer along the printing pattern using the photo resist as an etching mask, and striping the photo resist.

2 Claims, 9 Drawing Sheets (Related Art)

PRINTING SUBSTRATE FOR LIQUID CRYSTAL DISPLAY, AND MANUFACTURING METHOD THEREOF

This application claims the benefit of Korean Patent Application No. 10-2005-0058871, filed on Jun. 30, 2005, which is hereby incorporated by reference for all purposes as if fully set forth herein.

BACKGROUND OF THE INVENTION

1. Field of the Invention

The present invention relates to a printing substrate for a liquid crystal display and a manufacturing method thereof.

2. Discussion of the Related Art

FIG. 1 is a view for illustrating a related art resist printing method.

In the resist printing method of FIG. 1, a photo resist pattern P2 is not directly transcribed from a first transparent insulating substrate 110, on which a printing pattern is patterned to be used as a printing substrate, onto a second transparent insulating substrate 120, an object to be printed, but instead, the photo resist pattern P2 is first transferred to a blanket 100 whose surface is made of silicon rubber and the like and which serves as a medium, and then is transcribed using the second insulating substrate 120 as an object to be transcribed.

FIGS. 2 through 7 illustrate the respective steps of a method of manufacturing the printing substrate as shown in FIG. 1. FIG. 2 shows the step of depositing a metal layer 111 on the transparent insulating substrate 110, FIG. 3 shows the step of applying a photo resist 112 to pattern the metal layer 111, FIG. 4 shows the step of etching the metal layer 111 using a wet eching, FIG. 5 shows the step of striping the photo resist 112, FIG. 6 shows the step of forming the printing pattern P1 by etching the first transparent insulating substrate 110, and FIG. 7 shows the step of etching and striping the metal layer 111.

In FIG. 2, because the metal layer 111 is used as a mask when the first transparent insulating substrate 110 is etched in the step illustrated in FIG. 6, the metal layer is made of a material with a tolerance to etchants used to etch the first transparent insulating substrate 110, such as Cr, Mo, etc.

As such, since the wet etching has an isotropic etching property which shows a uniform etching property without respect to the direction of crystal faces, loss to critical dimension (CD) greatly occurs due to a collective wet etching upon forming the printing pattern P1, and thus this makes it difficult to manufacture a precise printing substrate having minute patterns formed thereon.

On the contrary, a dry etching performs an etching through the acceleration force and chemical action of ions in a plasma state using a mixed chemical gas, Ar or the like. Therefore, the dry etching has an anisotropic etching property, whereas the wet etching has the isotropic etching property since it is performed in the chemical solution.

Referring to FIGS. 4 and 6, it is an ideal case that the printing pattern P1 on the first transparent insulating substrate 110 is formed to have an exact width of d1. However, if the printing substrate is manufactured through the wet etching, loss in thickness occurs on both sides of the printing substrate by the factor of d2. As an example, a printing substrate manufactured through the wet etching is theoretically impossible to implement the minimum critical dimension having less than 10 μm with respect to its both sides due to its isotropic etching property in a case where the depth of etching is 5 μm.

That is, as the printing pattern P1 has its narrower width and deeper depth, and greater ratio of depth to width, its printing property becomes better. However, the related art method using the wet etching causes the width to be broadened as the depth increases, and thus is disadvantageous to manufacture a printing substrate with minute patterns, thereby making it difficult to improve pattern resolution and transcription property.

SUMMARY OF THE INVENTION

Accordingly, the present invention is directed to a printing substrate for a liquid crystal display and a manufacturing method thereof that substantially obviates one or more of the problems due to limitations and disadvantages of the related art.

An advantage of the present invention is to provide a printing substrate for a liquid crystal display which may mitigate the shortcoming of a resist printing process to implement minute patterns and thus improve pattern resolution and transcription property.

Another advantage of the present invention is to provide a manufacturing method of a printing substrate for a liquid crystal display which may efficiently manufacture a printing substrate for the liquid crystal display.

Additional features and advantages of the invention will be set forth in the description which follows, and in part will be apparent from the description or may be learned by practice of the invention. These and other advantages of the invention will be likely realized and attained by the structure particularly pointed out in the written description and claims hereof as well as the appended drawings.

To achieve these and other advantages and in accordance with the purpose of the present invention, as embodied and broadly described, a printing substrate for a liquid crystal display according to an embodiment of the present invention comprises a transparent insulating substrate and a material layer for dry etching formed on an upper surface of the transparent insulating substrate, the material layer for dry etching constituting a printing pattern.

In addition, to accomplish the above aspects, a manufacturing method of a printing substrate for a liquid crystal display according to another embodiment of the present invention comprises: forming a material layer on an upper surface of a transparent insulating substrate, applying a photo resist along a printing pattern on the upper side of the material layer, dry-etching the material layer along the printing pattern using the photo resist as an etching mask, and stripping the photo resist.

DETAILED DESCRIPTION OF THE ILLUSTRATED EMBODIMENTS

Reference will now be made in detail to embodiments of the present invention, examples of which are illustrated in the accompanying drawings.

Hereinafter, a printing substrate for a liquid crystal display according to embodiments of the present invention will be described in more detail with reference to FIGS. 8 through 10.

Figure 1:
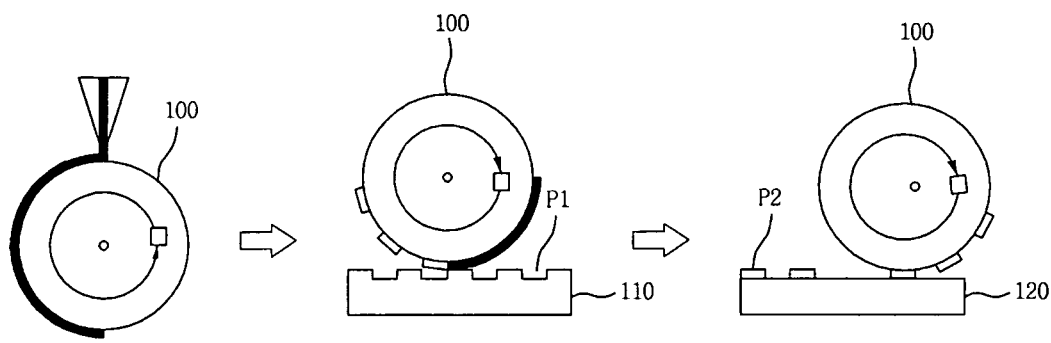
FIG. 1 is a view for illustrating a related art resist printing method.
Figure 2:
FIGS. 2 to 7 are views illustrating the respective steps of a manufacturing method of the printing substrate as shown in FIG. 1.
Figure 3:
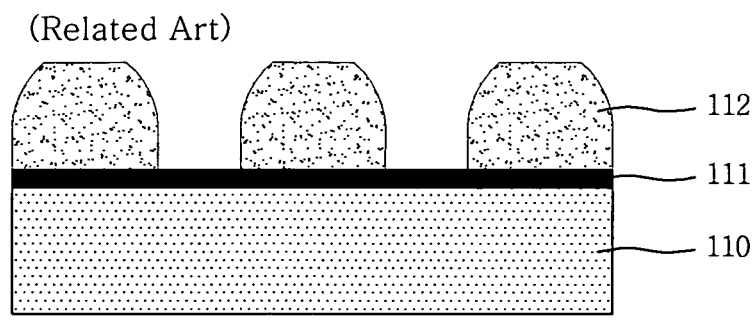
Figure 4:
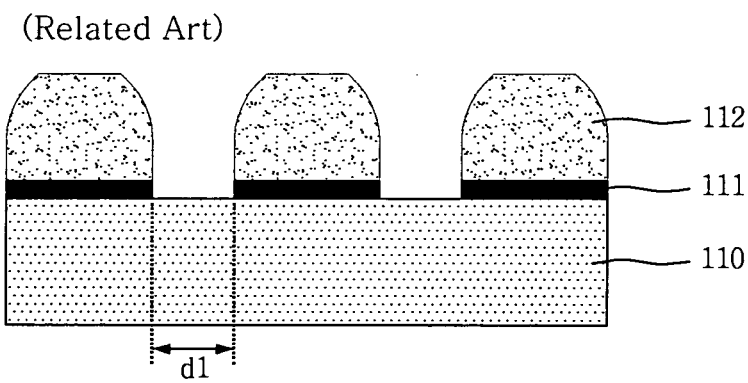
Figure 5:
Figure 6:
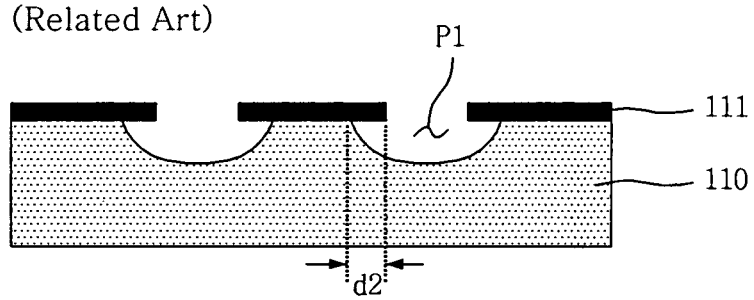
Figure 7:
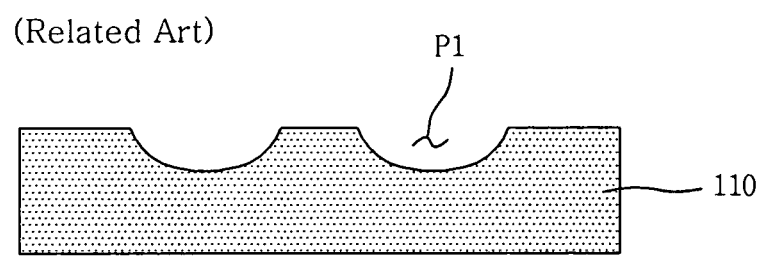
Figure 8:
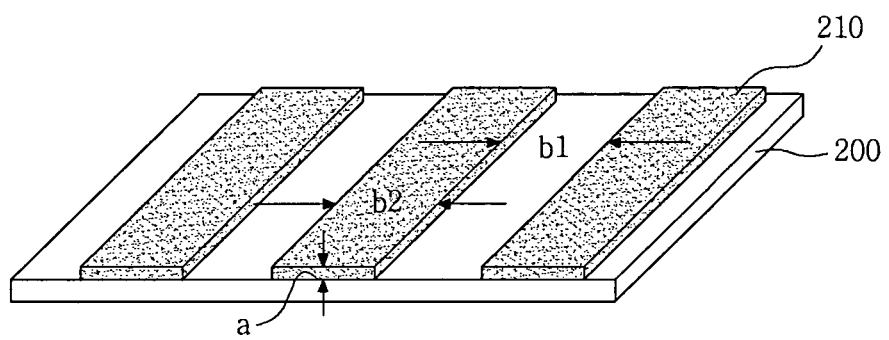
FIG. 8 is a view illustrating the printing substrate for the liquid crystal display according to a first embodiment of the present invention.

FIG. 8 is a view illustrating the printing substrate for the liquid crystal display according to the first embodiment of the present invention.

In FIG. 8, the printing substrate for the liquid crystal display according to the first embodiment of the present invention comprises a transparent insulating substrate 200, and a material layer 210 for dry etching. The material layer 210 for dry etching constitutes a printing pattern on an upper surface of the transparent insulating substrate 200.

The material layer 210 for dry etching may be formed of a Si-based material, such as a-Si, SiNx, SiOx, etc., which creates little loss of critical dimension during dry etching and thus performs dry etching well and provides a good transcription property.

In terms of a-Si, the a-Si may be easily deposited through a process such as PECVD (Plasma Enhanced Chemical Vapor Deposition), with a thickness formed of about 3 μm~30 μm.

As such, since the printing pattern formed with the material layer 210 for dry etching leads to little loss of the critical dimension, it is possible to efficiently form minute patterns whose width b1 or b2 is more than about 4 μm and less than about 10 μm, and whose depth a is more than about 20 μm and less than about 30 μm.

In the related art, a metal layer made of Cr and the like has been used as a mask material to etch the transparent insulating substrate 200. However, an embodiment of the present invention may employ a photo resist (PR) as the mask upon etching the silicon based material such as a-Si, and this makes it more advantageous to apply to the manufacturing process.

Figure 9:
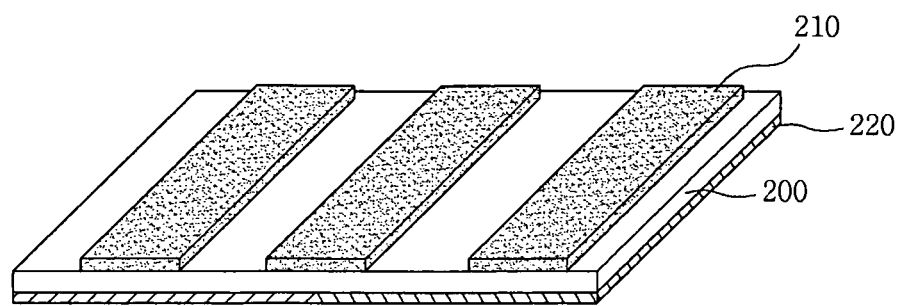
FIG. 9 is a view illustrating the printing substrate for the liquid crystal display according to a second embodiment of the present invention.

FIG. 9 is a view illustrating the printing substrate for the liquid crystal display according to a second embodiment of the present invention.

Referring to FIG. 9, a printing substrate for a liquid crystal display according to the second embodiment of the present invention comprises a transparent insulating substrate 200, a material layer 210 for dry etching, and a support layer 220. The material layer 210 for dry etching is formed on an upper surface of the transparent insulating substrate 200, and the support layer 220 covers a lower surface of the transparent insulating substrate 200.

The printing substrate manufactured as the first embodiment of the present invention has a great thickness in the material layer 210 for dry etching deposited on the transparent insulating substrate 200, and this may cause bending of the transparent insulating substrate 200 due to the increase of film stress.

To prevent this, the support layer 220, which may mitigate the increased stress, is deposited on the lower surface of the transparent insulating substrate 200 as shown in FIG. 9. As an example, if the same material is deposited on both surfaces of the transparent insulating substrate 200, theoretically film stress does not occur, and bending of the transparent insulating substrate 200 is not created.

The same material as the material layer 210 for dry etching, such as a-Si, SiNx, SiOx, etc. may be deposited as the support layer 220 with a same thickness as the material layer 210 for dry etching, or another material such as Cr, Mo, Al, etc. may be deposited.

Figure 10:
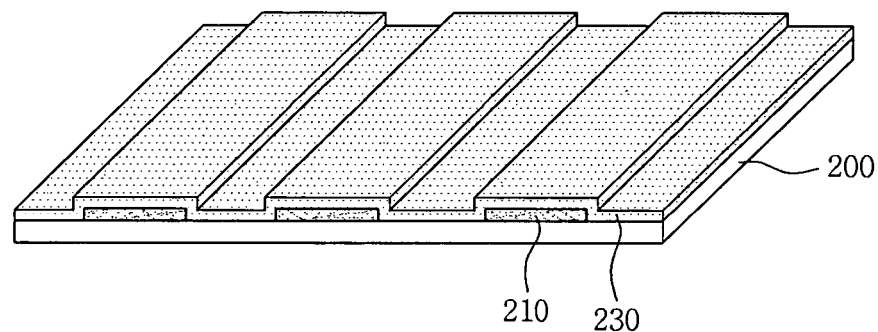
FIG. 10 is a view illustrating the printing substrate for the liquid crystal display according to a third embodiment of the present invention.

FIG. 10 is a view illustrating the printing substrate for the liquid crystal display according to a third embodiment of the present invention.

In FIG. 10, a printing substrate for a liquid crystal display according to the third embodiment of the present invention comprises a transparent insulating substrate 200, a material layer 210 for dry etching, and a material layer 230 for transcription. The material layer 210 for dry etching is formed on an upper surface of the transparent insulating substrate 200 to constitute a printing pattern, and the material layer 230 for transcription covers an upper surface of the transparent insulating substrate 200 including the material layer 210 for dry etching.

The material layer 230 for transcription may be formed of a metal or metal oxide.

The printing substrate should have a selection ratio which makes the transcription property good and the photo resist (PR) attached well so as to provide a good transcription from a blanket onto the printing substrate, and from the printing substrate onto the transparent insulating substrate for the liquid crystal display. Forming the printing substrate with the transparent insulating substrate 200 generally gives a good selection ratio. However, the embodiment of the present invention is deposited with the material layer 210 for dry etching such as a-Si, SiNx, SiOx, etc. to implement the critical dimension, and this may lead to a problem to the transcription property. To mitigate the problem, there is deposited the material layer 230 for transcription made of a material having a good transcription property on the entire surface of the transparent insulating substrate 200 formed with the material layer 210 for dry etching, as shown in FIG. 10.

In the first to third embodiments of the present invention, the material layer 210 for dry etching or the support layer 220 may be manufactured in a film type and attached on the transparent insulating substrate 200. In a case where the material layer 210 and support layer 220 are manufactured in an acryl-based film, they may be attached through a simple heat treatment process at a temperature less than about 200° C., and may also be formed to be attached without a separate heat treatment process by including an adhesive component.

Further, making the material layer 210 for dry etching, which constitutes a printing pattern, formed on the transparent insulating substrate 200, and simultaneously making the support layer 220 and material layer 230 for transcription formed on upper and lower surfaces thereof, prevents bending of the transparent insulating substrate 200, as well as improves the transcription property.

Hereinafter, a manufacturing method of a printing substrate for a liquid crystal display according to embodiments of the present invention will be described in more detail with reference to FIGS. 11 through 17.

Figure 11:
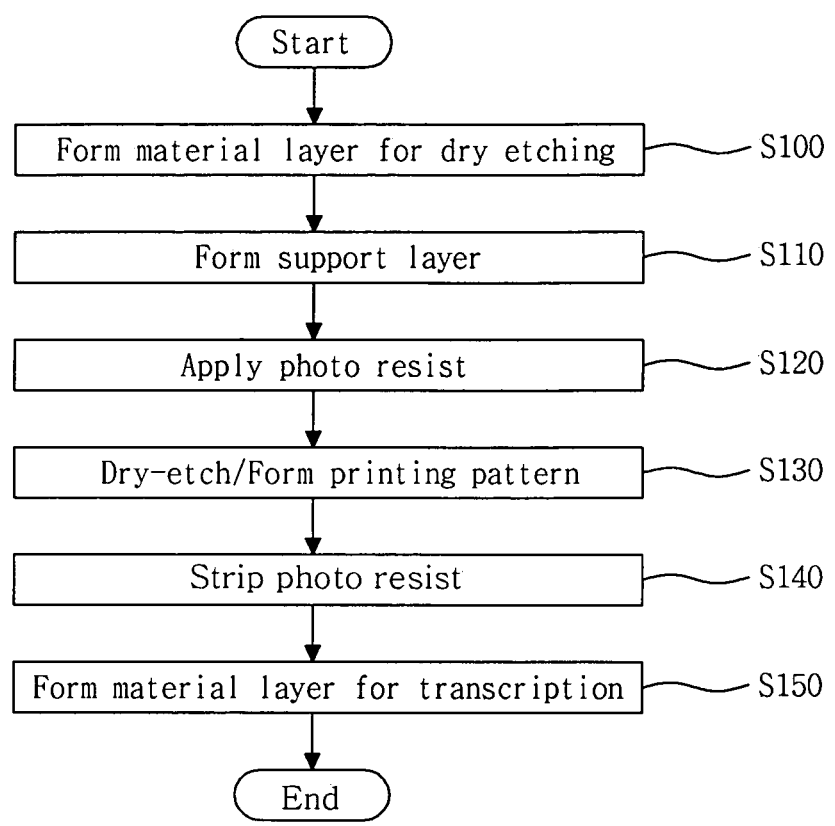
FIG. 11 is a flowchart illustrating a manufacturing method of a printing substrate for a liquid crystal display according to a first embodiment of the present invention.

FIG. 11 is a flowchart illustrating a manufacturing method of a printing substrate for a liquid crystal display according to a first embodiment of the present invention.

Figure 12:
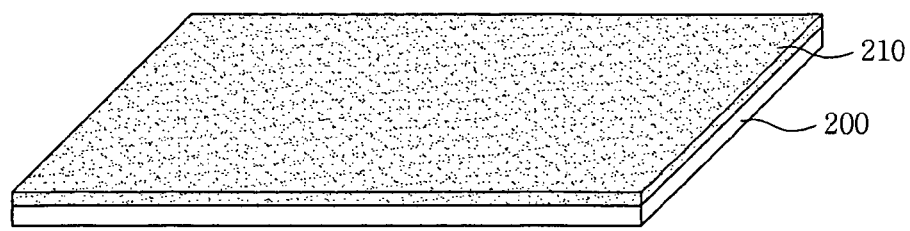
FIGS. 12 to 14 are views illustrating partial steps in the method as shown in FIG. 11.
Figure 13:
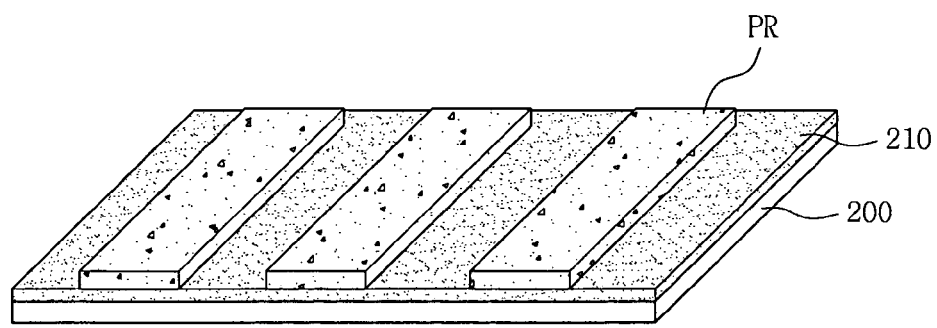
Figure 14:
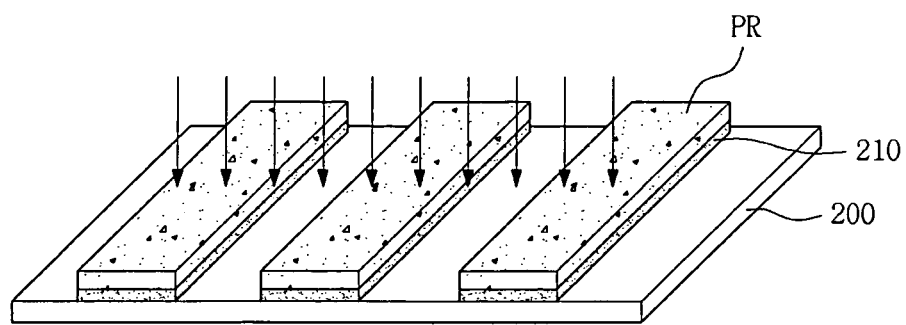
Figure 15:
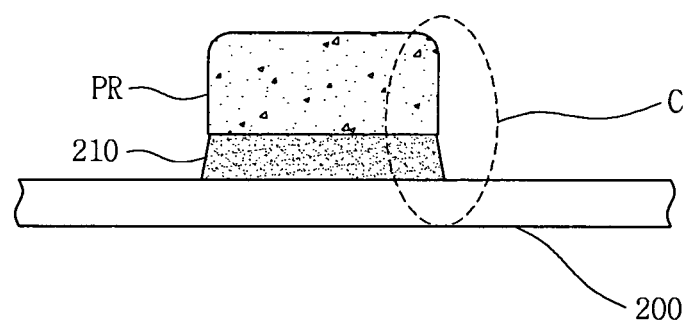
FIG. 15 is a view illustrating a part of FIG. 14 in more detail.

FIGS. 12 to 14 are views illustrating the respective steps, i.e. step S100, step S110, and step S120 of the method as shown in FIG. 11, and FIG. 15 is a view illustrating a part of FIG. 14 in more detail.

First, the material layer 210 for dry etching is deposited on the entire surface of the transparent insulating substrate 200 in the step S100, as shown in FIG. 12.

Then, in step S110, the support layer may be added on the lower surface of the transparent insulating substrate 200.

The material layer 210 for dry etching and support layer 220 may be formed of a same material having the same thickness. In addition, the material layer 210 for dry etching and support layer 220 may be formed of a material such as a-Si, SiNx, SiOx, and the like.

Next, a photo resist (PR) is applied along the printing pattern on the upper side of the material layer 210 for dry etching in the step S120, as shown in FIG. 13.

Subsequently, the material layer 210 for dry etching is dry-etched along the printing pattern using the photo resist (PR) as an etching mask in the step S130, as shown in FIG. 14.

The printing pattern formed by the material layer 210 for dry etching more than about 4 μm and less than about 10 μm in width, and more than about 20 μm and less than about 30 μm in depth through the dry etching.

Stripping the photo resist in step S140 completes the printing substrate for the liquid crystal display formed with the transparent insulating substrate 200 and the material layer 210 for dry etching which constitutes a pattern on the upper surface of the transparent insulating substrate 200, as shown in FIG. 8.

After stripping the photo resist (PR), in step S150, where the material layer 230 for transcription may be further added on the entire surface of the transparent insulating substrate 200 comprising the material layer 210 for dry etching.

The material layer 230 for transcription may be formed of a metal or metal oxide.

When the silicon-based material such as the a-Si is etched, there is little loss of the critical dimension, as shown in FIG. 15. That is, as shown in the etched portion C, the ends of the photo resist (PR) are nearly brought into line with the ends of the material layer 210 for dry etching. A primary gas used for dry etching is, for example, C12 in the case of etching a-Si, and a fluorine-based compound such as SF6, CF4, etc. in the case of etching SiNx or SiOx.

As such, since there is little loss to the critical dimension, it is possible to implement the minute critical dimension in the level of photolithography.

Figure 16:
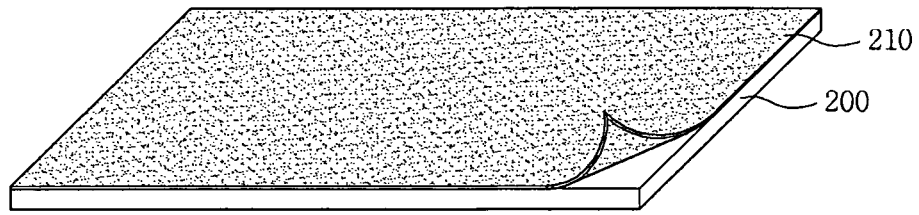
FIG. 16 is a view illustrating a manufacturing method of a printing substrate for a liquid crystal display according to a second embodiment of the present invention.

FIG. 16 is a view illustrating a manufacturing method of a printing substrate for a liquid crystal display according to a second embodiment of the present invention.

The material layer 210 for dry etching or the support layer 220 may be manufactured in a film type and attached on the transparent insulating substrate 200, as shown in FIG. 16. In a case where the material layer 210 and support layer 220 are manufactured in an acryl-based film, they may be attached using a simple heat treatment process at a temperature less than about 200° C., and may also be formed to be attached without a separate heat treatment process by including an adhesive component.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A manufacturing method of a printing substrate for a liquid crystal display comprising:
    depositing a material layer on an upper surface of a transparent insulating substrate, wherein the material layer is formed of at least one of a-Si, SiNx, and SiOx;
    depositing a support layer of the same material and the same thickness as the material layer directly on a lower surface of the transparent insulating substrate in order to configure the transparent insulating substrate having the same material of the same thickness on both surfaces so as to reduce a bending of the transparent insulating substrate during a printing process;
    applying a photo resist directly on the upper side of the material layer, without an intervening metal layer;
    dry-etching the material layer to form a printing pattern using the photo resist as an etching mask;
    stripping the photo resist; and
    forming a transcription layer of a metal or metal oxide on the dry-etched material layer,
    wherein the printing pattern is more than about 4 μm and less than about 10 μm in width.

2. The manufacturing method of the printing substrate for the liquid crystal display of claim 1, wherein the printing pattern is more than about 20 μm and less than about 30 μm in depth.

* * * * *